United States Patent [19]

Yoneda et al.

[11] Patent Number: 4,660,697

[45] Date of Patent: Apr. 28, 1987

[54] SLIP CLUTCH DEVICE CONTROL METHOD

[75] Inventors: Haruaki Yoneda, Kyoto; Takeo Hiramatsu, Nagaokakyo, both of Japan

[73] Assignees: Mitsubishi Jidosha Kogyo Kabushiki Kaisha; Nippon Jidosha Eng. Kabushiki Kaisha, both of Tokyo, Japan

[21] Appl. No.: 764,649

[22] Filed: Aug. 12, 1985

[30] Foreign Application Priority Data

Aug. 17, 1984 [JP] Japan .................................. 59-171703

[51] Int. Cl.$^4$ ............................................. B60K 41/28
[52] U.S. Cl. ................................ 192/0.033; 192/0.052; 192/0.076; 192/103 R; 74/731
[58] Field of Search ............. 192/103 R, 0.076, 0.075, 192/0.07, 0.096, 0.032, 0.033, 3.33, 3.32, 3.31, 3.3, 3.29, 0.052; 74/731, 732, 733

[56] References Cited

U.S. PATENT DOCUMENTS

| | | | |
|---|---|---|---|
| 4,004,417 | 1/1977 | Woody et al. ................. | 192/3.33 X |
| 4,457,411 | 7/1984 | Hiramatsu . | |
| 4,468,988 | 9/1984 | Hiramatsu . | |
| 4,529,072 | 7/1985 | Oguma et al. ................ | 192/0.076 X |
| 4,577,737 | 3/1986 | Niikura et al. .................... | 192/0.032 |
| 4,582,185 | 4/1986 | Grimes et al. .................... | 192/0.076 |

Primary Examiner—George H. Krizmanich
Attorney, Agent, or Firm—Oldham, Oldham & Weber Co.

[57] ABSTRACT

In the control of the slip in a slip clutch device for joining and separating an input shaft and an output shaft, the improvement comprises detecting a slip in the clutch, calculating a time change in the said slip and calculating a slip deviation between a preset target slip and the said slip, and feedback-controlling the engaging force of the clutch in proportion to the quantity of the time change in the said slip, obtained from these calculations, and the slip deviation so that the slip in the clutch is caused to get near to the target slip.

According to the slip clutch device control method of this invention, the hunting in slip can be prevented from being caused even when the $\mu$-v characteristics of a clutch facing is worsened, and a shock applied upon the clutch at the start of its operation can be reduced in a large extent.

4 Claims, 11 Drawing Figures

SLIP CLUTCH DEVICE CONTROL METHOD

BACKGROUND OF THE INVENTION (1) Field of the Invention

This invention relates to a method for controlling a slip clutch device used in a motor vehicle.

(2) Description of the Prior Art

In a conventional torque transmitting system of the hydraulic torque converter type comprising a slip clutch arranged in parallel, as shown in FIG. 8, the rotating power from the output shaft 1 of an engine E (this is the input shaft of a torque converter and clutch 7 mentioned below) is transmitted to the input shaft 4 of a transmission 3 (this is the output shaft of the torque converter and clutch 7 mentioned below) by way of a torque converter 2, changed in speed properly and transmitted to driving wheels by way of the output shaft 5 of the transmission 3 and a differential mechanism 6.

The clutch 7 is arranged in parallel with the torque converter 2 between the output shaft 1 of the engine E and the input shaft 4 of the transmission 3. In normal operation, a front cover 1a on the side of the output shaft 1 and a facing 4b provided on a clutch plate 4a on the side of the input shaft 4 are kept in an engaged state with a fine slip so that the clutch plate 4a is rotated almost at the same speed as the front cover 1a.

Under the following conditions (i.e. the following driving states or engine conditions), the front cover 1a and clutch plate 4a are brought into a released state by a clutch control mechanism M1 so that the input shaft 4 is rotated by the driving force transmitted by way of the torque converter 2:

(1) when the temperature of cooling water for the engine is below 50° C., (2) in the forward movement at the first gear or in the backward movement, (3) when the rotation speed of the engine is below about 1300 rpm, (4) in the operating zone wherein the rotation speed of the engine is below about 2000 rpm and the opening degree of a throttle is large, (5) in the engine braking, or (6) when shifted down from the third gear to the second gear.

The clutch control mechanism M1 comprises: a control unit 13 which receives detection signals from a water temperature sensor 8, a rotation speed sensor 9 for a planetary gear part 3a, a rotation speed sensor 10 for the transmission output shaft 5, an engine rotation speed sensor 11 and a throttle opening sensor 12, which detect each of the above-mentioned conditions respectively; a duty solenoid valve 14 which receives control signals from said control unit 13 and is opened to control the control oil pressure from a pressure regulation valve 15; and an oil pressure control valve 16 which receives the control oil pressure regulated by said duty solenoid valve 14 and controls the feed and discharge of working oil from an oil pressure source (not shown) to and from the working oil chamber 7a and release oil chamber 7b of the clutch 7.

The clutch 7 is so set that a fine slipping state is caused between a complete engagement period in that the speeds of the front cover 1a and clutch plate 4a are equal to each other and a sliding state produced by the torque converter 2 (this is the state in that the clutch 7 is released), by causing the clutch plate 4a to slip finely to the front cover 1a in the engagement of the same clutch 7. This fine slip is feedback-controlled so as to become a set target value So previously set in proportion to the rotation speed and load of the engine E, with some tolerance provided to the minimum value that can interrupt the torque variation of the engine E.

In a conventional control method which is practised in such a slip clutch device as mentioned above, the absolute value S of a difference between the rotation speed of the engine and that of a turbine is compared with a target slip So, and then a corrective quantity for the duty of a clutch-engaging oil pressure per unit time (%/sec) is determined in proportion to the rate ($\Delta S/S$) of a difference $\Delta S$ ($=S-So$) between the absolute value S and the target slip So to the absolute value S, as shown in FIG. 9.

In such a conventional method as aforementioned, which controls the slip clutch device, however, the $\mu$-v characteristics (the coefficient of friction - slipping velocity characteristics) of the facing 4b would be worsened, as shown in FIG. 10, due to the deterioration of the working oil or the mixing of other oils different in kind in the course of use, although a stable operation is obtained at the beginning of use.

Because of this worsening, the feedback control system thereof would become unstable and the slip in the clutch would be disadvantageously hunting at about 1 Hz, as shown in FIG. 11 (a) and (b).

SUMMARY OF THE INVENTION

With the foregoing in view, the present invention is intended to dissolve these disadvantages, and has as its object the provision of a slip clutch device control method in which the hunting in slip can be prevented from being caused even when the $\mu$-v characteristics of a clutch facing is worsened, and a shock applied upon the clutch at the start of its operation can be further reduced in a large extent.

To this end, the slip clutch device control method according to this invention is characterized by comprising, in control of the slip in a clutch for joining and separating an input shaft and an output shaft, detecting a slip in the clutch, calculating a time change in the said slip and calculating a slip deviation between a predetermined target slip and the said slip, and feedback-controlling the engaging force of the clutch in proportion to the calculated quantity of the time change in the said slip and the calculated slip deviation so that the slip in the clutch is caused to get near to the target slip.

According to the slip clutch device control method of this invention composed as aforementioned, the engaging force of the clutch is controlled in proportion to the quantity of the time change in slip and the slip deviation in the same clutch at the start of its operation, whereby even when the $\mu$-v characteristics of the clutch facing is worsened due to the deterioration of the working oil or the mixing of other oils different in kind in the course of use, the slip in the clutch can be controlled at a proper value, without causing the hunting in slip.

The above and other objects, features and advantages of the present invention will become apparent from the following description and the appended claims, taken in conjunction with the accompanying drawings.

BRIEF DESCRIPTION OF THE DRAWINGS

In the accompanying drawings:

FIG. 1 is a flow chart showing the control procedure thereof;

FIG. 2 is a rough constructive view of a slip clutch device in which this method is practised;

FIGS. 3 to 7 are graphs for illustrating this method, respectively;

FIG. 8 is a constructive view of a slip clutch device in which the conventional method is practised;

FIGS. 9 to 10 and FIG. 11 (a) and (b) are graphs for illustrating the conventional method.

DETAILED DESCRIPTION OF THE INVENTION

Referring now to FIG. 1 to FIG. 7 of the accompanying drawings, one preferred embodiment of this invention will be described.

Figure 2:
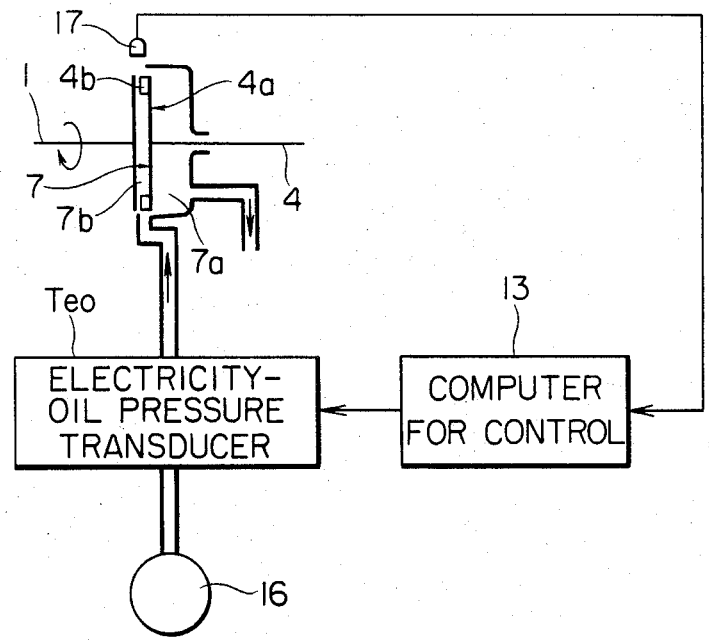
Figure 8:
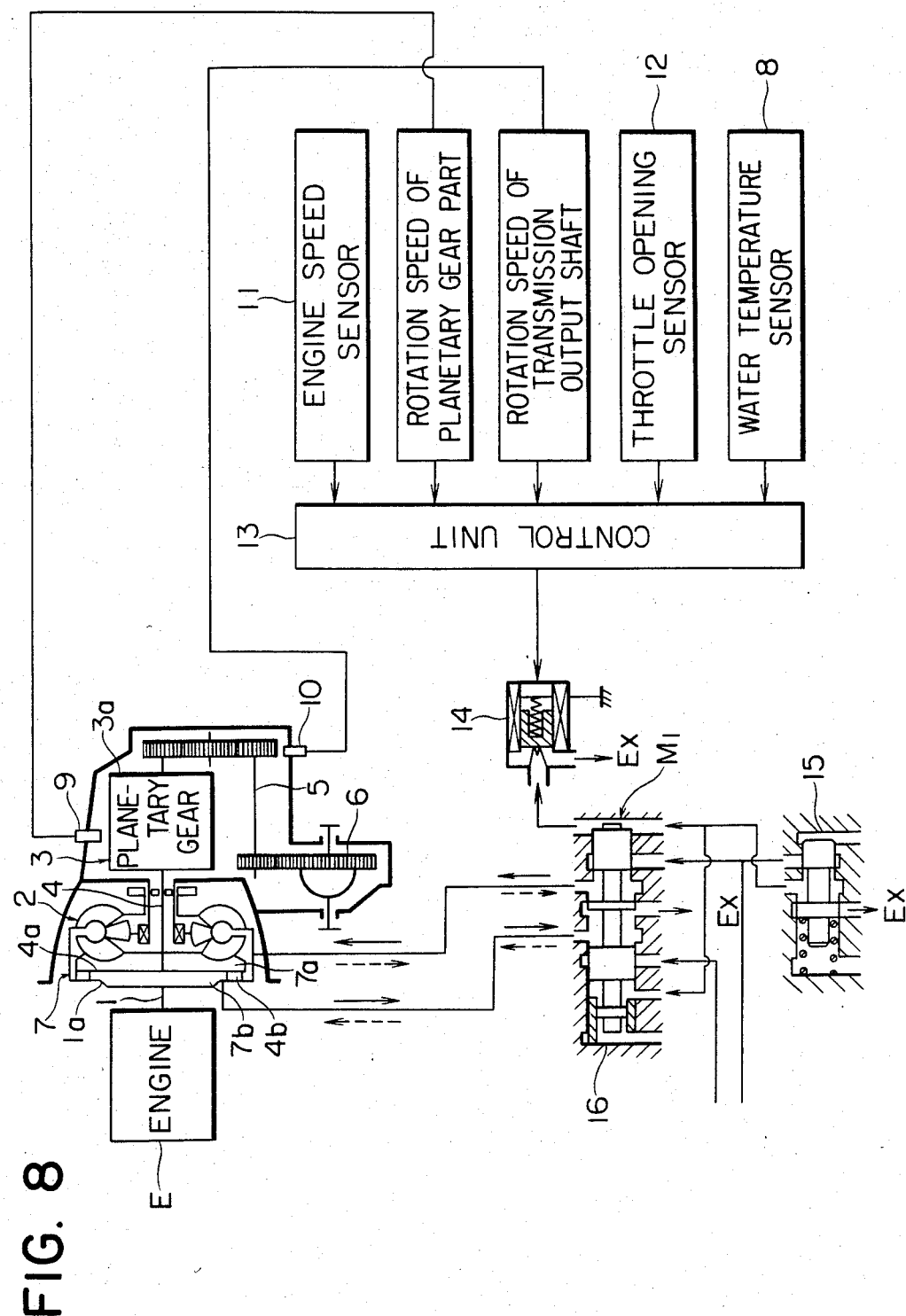
FIG. 8 to FIG. 11 illustrate a conventional slip clutch device control method.
Figure 9:
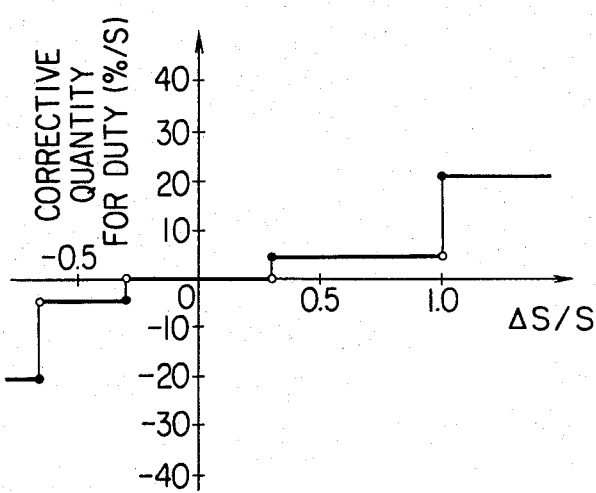
Figure 10:
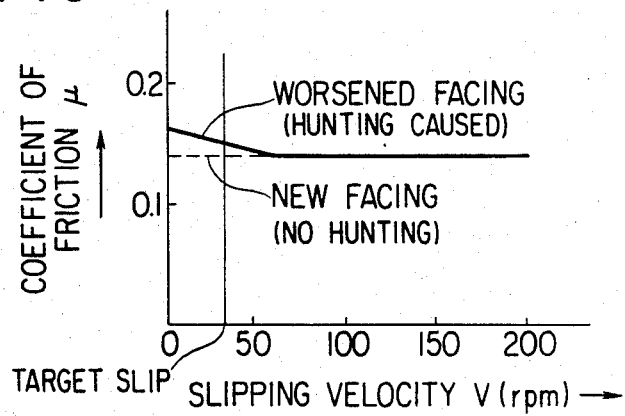
Figure 11:
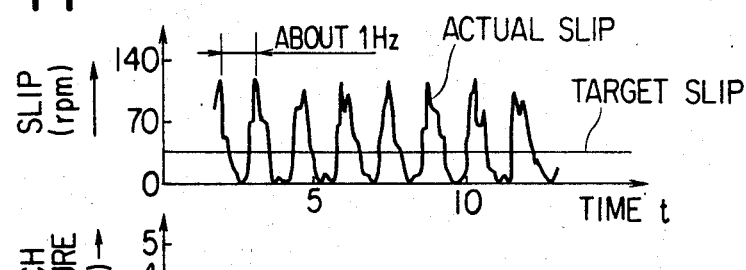
Figure 11:
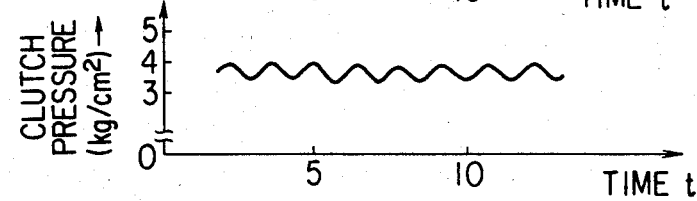

In a torque transmitting system of the hydraulic torque converter type comprising a slip clutch arranged in parallel, as shown in FIG. 2 and FIG. 8, the rotating power from the output shaft 1 of an engine E (this is the input shaft of a torque converter and clutch 7) is transmitted to the input shaft 4 of a transmission 3 (this is the output shaft of the torque converter and clutch 7) by way of a torque converter 2, changed in speed properly, and transmitted to driving wheels by way of the output shaft 5 of the transmission 3 and a differential mechanism 6.

The clutch 7 is arranged in parallel with the torque converter 2 between the output shaft 1 of the engine E and the input shaft 4 of the transmission 3. In normal operation, a front cover 1a on the side of the output shaft 1 and a facing 4b provided on a clutch plate 4a on the side of the input shaft 4 are kept in an engaged state with a fine slip so that the clutch plate 4a is rotated almost at the same speed as the front cover 1a.

Under the same conditions (i.e. the same driving states or engine conditions) as in the above-mentioned conventional example, the front cover 1a and clutch plate 4a are brought into a released state by a clutch control mechanism M1 so that the input shaft 4 is rotated by the driving force transmitted by way of the torque converter 2.

The clutch control mechanism M1 comprises: a control unit 13 composed of a computer which receives detection signals from a water temperature sensor 8, a rotation speed sensor 9 for a planetary gear part 3a, a rotation speed sensor 10 for the transmission output shaft 5, an engine rotation speed sensor 11 and a throttle opening sensor 12, which detect each of these conditions respectively; a duty solenoid valve 14 which receives control signals from said control unit 13 and is opened to control the control oil pressure from a pressure regulation valve 15; an oil pressure control valve 16 which receives the control oil pressure regulated by said duty solenoid valve 14 and controls the feed and discharge of working oil from an oil pressure source (not shown) to and from the working oil chamber 7a and release oil chamber 7b of the clutch 7; and a slip detection sensor 17 for detecting the slip between the front cover 1a and the clutch plate 4a. This slip detection sensor 17 may be made up of two sensors which detect the rotation speeds of the output shaft 1 and input shaft 4, respectively. In case of this embodiment, the rotation speed of the output shaft 1 can be detected by means of the engine speed sensor 11 and the rotation speed of the input shaft 4 can be obtained by multiplying the output value of the rotation speed sensor 11 for the output shaft 5 by the change gear ratio of the transmission 3.

The said duty solenoid valve 14 and oil pressure control valve 16 constitute an electricity-oil pressure transducer Teo.

The clutch 7 is so set that a fine slipping state is caused between a complete engagement period in that the speeds of the front cover 1a and clutch plate 4a are equal to each other and a sliding state produced by the torque converter 2 (this is the state in that the clutch 7 is released), by causing the clutch plate 4a to slip finely to the front cover 1a in the engagement of the same clutch 7.

Figure 1:
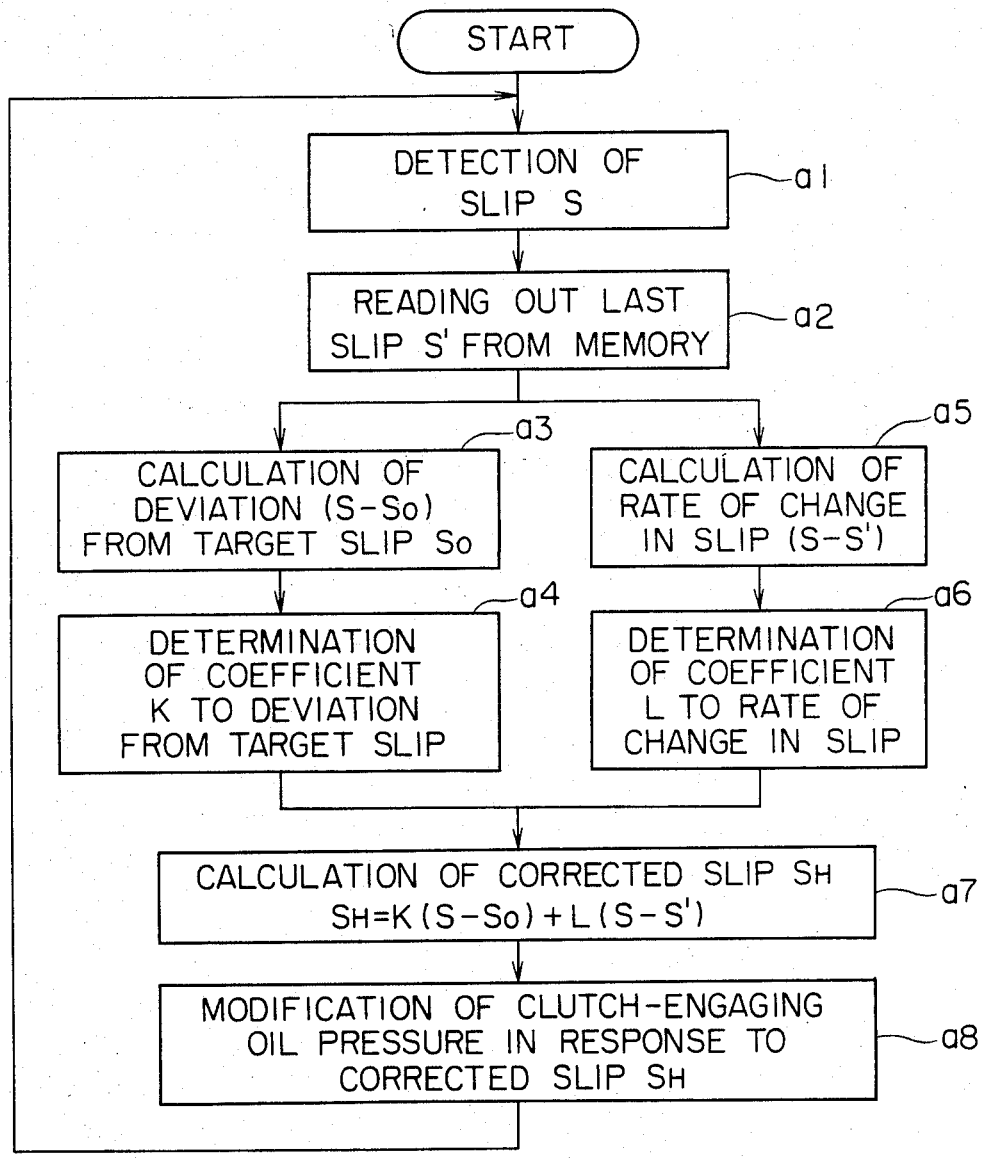
FIG. 1 to FIG. 7 illustrate a slip clutch device control method in accordance with one embodiment of this invention.
Figure 3:
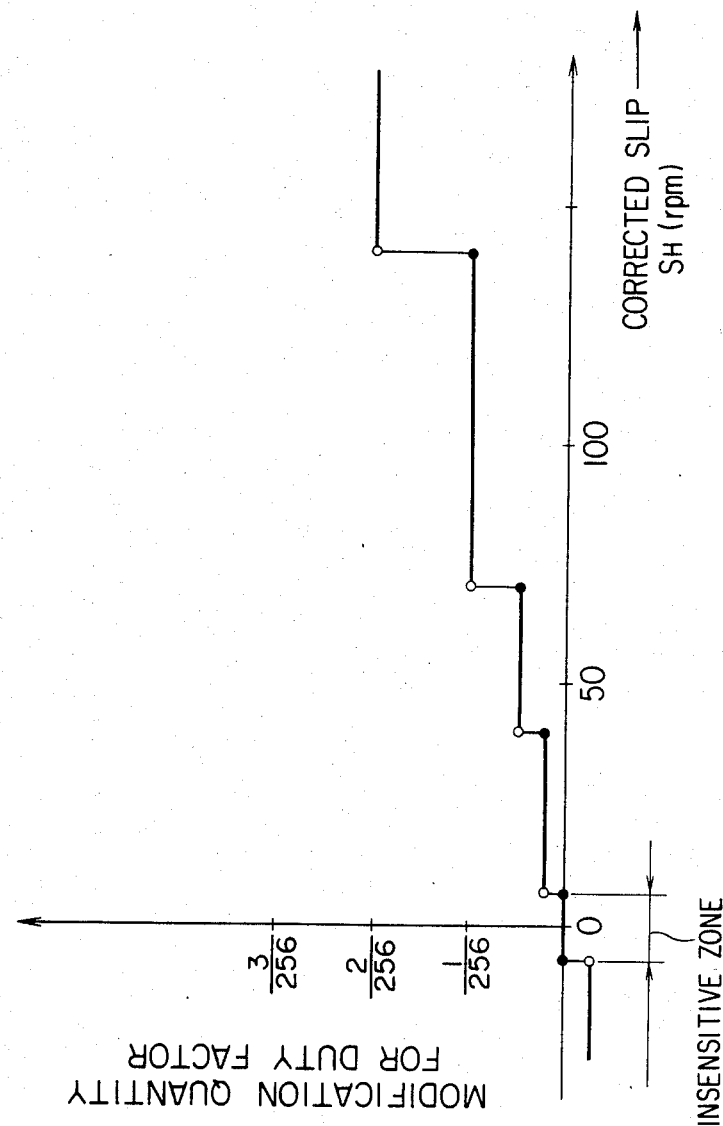

In the control method according to the present invention which is practised in such a slip clutch device as mentioned above, a next modificative quantity for a duty factor will be determined through the following steps to a set target value So previously set in proportion to the rotation speed and load of the engine E, with some tolerance provided to the minimum value that can interrupt the torque variation of the engine E, as shown in FIG. 1 and FIG. 3.

(1) detecting an actual slip S by means of the slip detection sensor 17 (step a1), (2) reading out the last slip S' from the memory of the control unit 13 (step a2), (3) calculating a deviation of the actual slip S from a target slip So (a slip deviation: S−So) (step a3), (4) determining a coefficient K to the slip deviation (S−So) (step a4), (5) calculating the rate of change in slip (S−S') from the actual slip S and the last slip S' (step a5), (6) determining a coefficient L to the rate of change in slip (S−S') (step a6), (7) calculating a corrected slip SH from the following equation (step a7);

$$SH = K(S - So) + L(S - S'),$$

and (8) determining a modificative quantity for a duty factor in proportion to the corrected slip SH (see: FIG. 3), and correcting the duty factor on the basis of this determined modificative quantity to modify a clutch-engaging oil pressure (step a8).

Thus, the pressure of the working oil to be fed to the clutch 7 is feedback-controlled in every modification interval T1 (65–120 msec) which varies in response to the rotation speed of the engine so as to become a modified clutch-engaging oil pressure, and as a result, the clutch plate 4a is controlled so as to get into engagement with the front cover 1a, with the target slip So.

The value calculated by multiplying the modificative quantity for the duty factor by a numerical value (100/T1) corresponds to a corrective quantity for the duty per unit time (%/sec).

Figure 4:
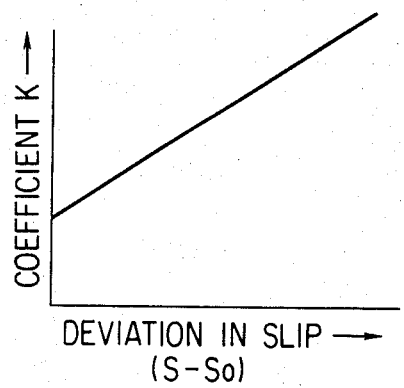

In the abovedescribed procedure, the items (3) and (4) may be replaced with the items (5) and (6), or the calculations in the items (3) and (4) may be carried out in parallel with those of the items (5) and (6). In addition, the items (4) and (5) may be modified as described below;

(a) When the deviation in slip (the slip deviation) is large, as shown in FIG. 4, the value of the coefficient K to the slip deviation (S−So) is made larger, as compared with the case in that the deviation in slip is small, thereby to improve the convergency of the slip to the target value.

Figure 5:
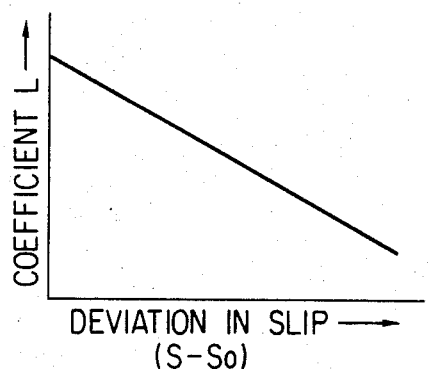
Figure 6:
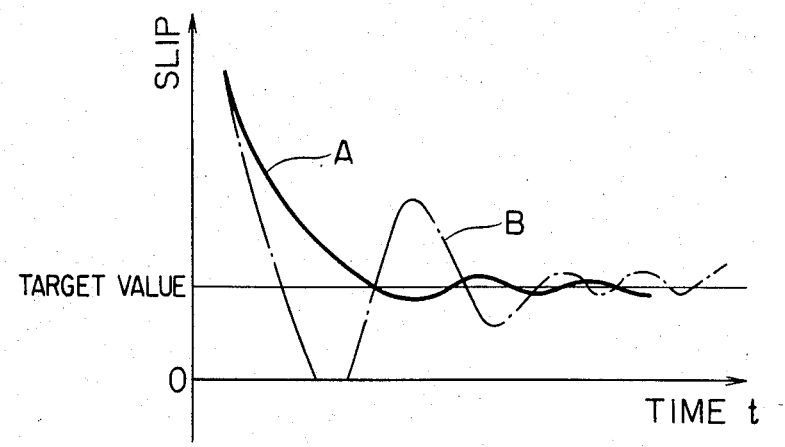

(b) When the deviation in slip is large, as shown in FIG. 5, the value of the coefficient L to the rate of change in slip (S−S') is made smaller, as compared with the case in that the deviation in slip is small, thereby to improve the damping performance only when the deviation in slip is small.

In the correction of the duty factor, the values of the coefficient K to the slip deviation (S−So) of the actual slip S from the target slip So and the coefficient L to the rate of change in slip (S−S') will be selected at those determined through the stability analysis based on the automatic control theory, with the responsibility and stability satisfied at the same time.

In order to facilitate the control, the width of an insensitive zone will be further selected at the minimum value which is determined by the rotation speed-detecting accuracy and the slip-calculating accuracy.

The slip clutch device control method according to the embodiment of this invention is so composed as stated above. By making the coefficient K to the slip deviation (S−So) larger and making the coefficient L to the rate of change in slip (S−S') smaller when the deviation between the actual slip S and the target slip So is large, for instance at the start of the operation of the clutch, the rate of convergence of the actual slip S to the target slip So can be therefore accelerated, as shown as the characteristics of this invention designated by the letter A in FIG. 6, when compared to that of the conventional characteristics also designated by the letter B in the same figure.

Figure 7:
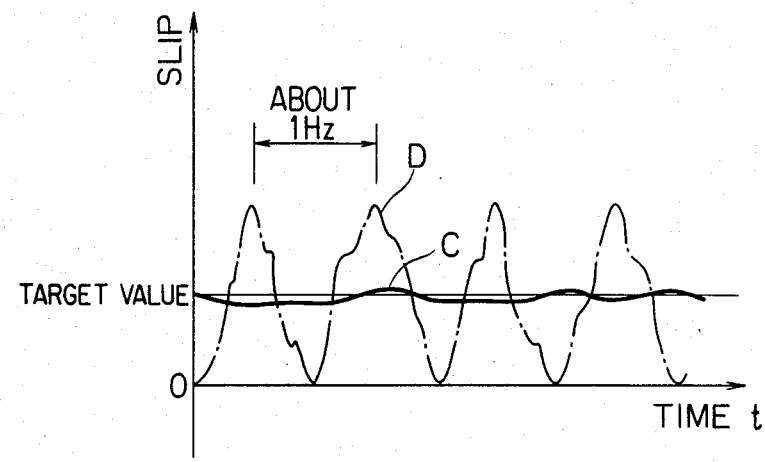

By making the coefficient K to the slip deviation (S−So) smaller and making the coefficient L to the rate of change in slip (S−S') larger when the deviation between the actual slip S and the target slip So is small, a sudden change in slip can be restrained as shown as the characteristics of this invention designated by the letter C in FIG. 7. Thus, excellent damping characteristics can be obtained, when compared to the change in slip shown as the conventional characteristics designated by the letter D in the same figure.

According to the slip clutch device control method of this invention, as aforementioned in detail, the following effects and advantages can be obtained through such a simple procedure which comprises, in control of the slip in a clutch for joining and separating an input shaft and an output shaft, detecting a slip in the clutch, calculating a time change in the said slip and calculating a slip deviation between a predetermined target slip and the said slip, and feedback-controlling the engaging force of the clutch in proportion to the calculated quantity of the time change in the said slip, and the calculated slip deviation so that the slip in the clutch is caused to get near to the target slip:

(1) Since the engaging force of the clutch is controlled in proportion to the quantity of the time change in slip in the same clutch at the start of its operation, a sudden change in slip can be restrained and a shock applied upon the clutch at the start of its operation can be reduced.

(2) Even when the $\mu$-v characteristics of the clutch facing is worsened due to the deterioration of the working oil or the mixing of other oils different in kind in the course of use, the hunting in slip can be restrained by the excellent damping characteristics.

In the aforementioned embodiment, both the coefficients K and L are changed together to the slip deviation (S−So). Even if either of these coefficients is set at a given value as the case may be, the same effects can be almost achieved as in the aforementioned embodiment.

Having now fully described the invention, it will be apparent to one of ordinary skill in the art that many changes and modifications can be made thereto without departing from the spirit and scope of the invention as set forth herein.

What is claimed is:

1. A slip clutch device control method for controlling the slip in a clutch for joining and separating an input shaft and an output shaft, comprising the steps of:
   detecting a slip in the clutch;
   calculating a time change in the said slip;
   calculating a slip deviation between a predetermined target slip and the said slip; and
   feedback-controlling the engaging force of the clutch in proportion to the calculated quantity of the time change in the said slip and the calculated slip deviation so that the slip in the clutch is caused to get near to the target slip.

2. A slip clutch device control method as set forth in claim 1, further comprising the step of:
   calculating a corrected slip from the calculated quantity of the time change in the said slip and the calculated slip deviation so that the engaging force of the clutch is corrected in proportion to the calculated corrected slip.

3. A slip clutch device control method as set forth in claim 2, in which the said step of calculating the corrected slip, a coefficient on the quantity of the time change in the said slip is set so as to reduce in accordance with the increase in the slip deviation.

4. A slip clutch device control method as set forth in claim 2, in which the said step of calculating the corrected slip, a coefficient on the slip deviation is set so as to increase in accordance with the increase in the said slip deviation.

* * * * *